(No Model.)

J. R. GUMP.
CHECKREIN HOOK.

No. 565,268. Patented Aug. 4, 1896.

Witnesses:

Inventor:
Joseph R. Gump,
By Attorneys.

UNITED STATES PATENT OFFICE.

JOSEPH R. GUMP, OF MILAN, MICHIGAN.

CHECKREIN-HOOK.

SPECIFICATION forming part of Letters Patent No. 565,268, dated August 4, 1896.

Application filed February 8, 1896. Serial No. 578,544. (No model.)

*To all whom it may concern:*

Be it known that I, JOSEPH R. GUMP, a citizen of the United States, residing at Milan, in the county of Washtenaw and State of Michigan, have invented certain new and useful Improvements in Checkrein-Hooks, of which the following is a specification, reference being had therein to the accompanying drawings.

The invention consists in the construction of a checkrein-hook designed for securing, that is, to prevent the checkrein from becoming accidentally disengaged from the hook when in use, and to facilitate the disengagement of the rein in the hook in unchecking.

The invention further consists in the peculiar construction, arrangement, and combination of the various parts, all as more fully hereinafter described.

Figure 1:
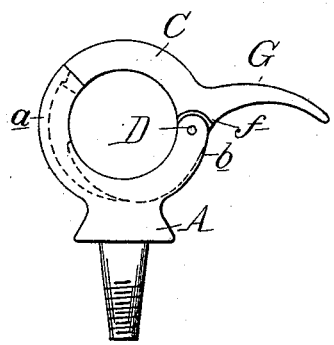
Figure 2:
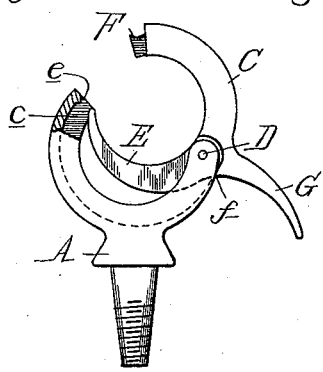
Figure 3:
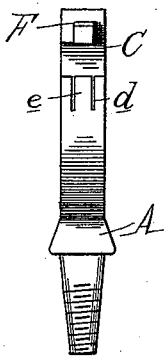

In the drawings, Figure 1 is a side elevation of my improved device, and Fig. 2 is a similar elevation, partly in section, showing the hook in its open position. Fig. 3 is a front elevation showing the locking-frame open.

A is the base, having a hook on top, preferably substantially U-shaped and forming the forward member $a$ and the rear member $b$, the forward member being longer than the rear member. The rear member $b$ is bifurcated, and the groove $c$ extends from the bifurcation to the top of the arm $a$, as plainly shown in dotted lines in Figs. 1 and 2. A spring-tongue is formed at the upper end of the arm $a$ by cutting the kerfs $d$ at each edge of the groove, leaving the tongue $e$ between, the metal being sufficiently thin to give the desired elasticity.

C is a U-shaped locking-frame, pivoted at its middle point on the pin D in the bifurcation of the arm $b$. The lower arm E of this frame is within the hook, its outer end working in the groove $c$. The outer arm is provided with a locking-lug F, with a suitable lip adapted to engage with the lip $e$ on the spring-tongue.

G is a finger-piece for actuating the locking-frame to uncheck the rein, having the shoulder $f$ adapted to limit its opening movement.

The parts being thus constructed their operation is as follows: The device being secured upon the saddle in the usual manner, to check the horse the operator opens the hook, as shown in Fig. 2, engages the checkrein therein, and closes the hook, pressing down upon the upper arm of the locking-frame and snapping the locking-lug into the spring-tongue. To uncheck it, the operator depresses the finger-piece G, which not only opens the hook, as shown in Fig. 2, but alines the arm E in the upper end of the arm $a$, so as to make a continuous face over which the checkrein may be drawn.

What I claim as my invention is—

A checkrein-hook, comprising the base, the U-shaped hook thereon, having its front arm higher than the rear arm, a correspondingly-shaped frame centrally pivoted on the rear arm, a groove in the inner face of the hook in which the end of one arm engages, and a spring-tongue on the hook at the upper end of the forward arm, a locking-lug on the upper end of the frame and a finger-piece on the frame for actuating the same.

In testimony whereof I affix my signature in presence of two witnesses.

JOSEPH R. GUMP.

Witnesses:
M. B. O'DOGHERTY,
O. F. BARTHEL.